US010085302B2

(12) United States Patent
Noriega et al.

(10) Patent No.: US 10,085,302 B2
(45) Date of Patent: Sep. 25, 2018

(54) ACCESS NODE ARCHITECTURE FOR 5G RADIO AND OTHER ACCESS NETWORKS

(71) Applicants: AT&T Mobility II LLC, Atlanta, GA (US); AT&T Intellectual Property I, L.P., Atlanta, GA (US)

(72) Inventors: Dimas R. Noriega, Woodstock, GA (US); Arthur R. Brisebois, Cumming, GA (US); Giuseppe De Rosa, Atlanta, GA (US); Henry J. Fowler, Jr., Alpharetta, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/705,767

(22) Filed: Sep. 15, 2017

(65) Prior Publication Data

US 2018/0007737 A1    Jan. 4, 2018

Related U.S. Application Data

(63) Continuation of application No. 14/983,213, filed on Dec. 29, 2015, now Pat. No. 9,769,873.

(51) Int. Cl.
*H04W 88/08* (2009.01)
(52) U.S. Cl.
CPC .................... *H04W 88/08* (2013.01)
(58) Field of Classification Search
CPC ..................................................... H04W 88/08
See application file for complete search history.

(56) References Cited

U.S. PATENT DOCUMENTS

| 2011/0302390 | A1* | 12/2011 | Copeland | H04B 1/0003 |
| | | | | 712/2 |
| 2013/0003709 | A1* | 1/2013 | Kalhan | H04W 76/025 |
| | | | | 370/338 |
| 2013/0322316 | A1* | 12/2013 | Hara | H04W 76/048 |
| | | | | 370/311 |

(Continued)

FOREIGN PATENT DOCUMENTS

WO    WO 2015053685 A1    4/2015

OTHER PUBLICATIONS

Mitchell, John E., "Integrated Wireless Backhaul Over Optical Access Networks," Journal of Lightwave Technology, vol. 32, No. 20, Oct. 15, 2014, pp. 3373-3382.

(Continued)

*Primary Examiner* — Marcos Torres
(74) *Attorney, Agent, or Firm* — Zagorin Cave LLP

(57) ABSTRACT

An access node for a telecommunications network is partitioned into a front end unit and a back end unit coupled by an internet protocol (IP) packet based communication link to provide for data and control packets to be sent between the back end unit and the front end unit. The front end unit performs physical layer and media access layer (MAC) sublayer processing for data for transmission to/from user equipment in the network using baseband processing units that perform highly parallel floating/fixed point operations. The back end unit includes a plurality of general purpose processors to provide data link layer and network layer processing. back end portions may be pooled to provide greater efficiency.

16 Claims, 12 Drawing Sheets

(56) References Cited

U.S. PATENT DOCUMENTS

| | | |
|---|---|---|
| 2015/0215044 A1 | 7/2015 | Cvijetic et al. |
| 2015/0215831 A1 | 7/2015 | Jung et al. |
| 2015/0264596 A1 | 9/2015 | Franklin et al. |
| 2015/0280802 A1 | 10/2015 | Thomas et al. |
| 2015/0282150 A1 | 10/2015 | Nigam et al. |
| 2015/0327169 A1 | 11/2015 | Nigam et al. |
| 2015/0327193 A1 | 11/2015 | Yu et al. |
| 2015/0327315 A1 | 11/2015 | Xue et al. |

OTHER PUBLICATIONS

Network Functions Virtualisation—Introductory White Paper, Issue 1, SDN and OpenFlow World Congress, Darmstadt-Germany, Oct. 22-24, 2012, pp. 1-16.

\* cited by examiner

ACCESS NODE ARCHITECTURE FOR 5G RADIO AND OTHER ACCESS NETWORKS

CROSS-REFERENCE TO RELATED APPLICATION(S)

This application is a continuation of application Ser. No. 14/983,213, filed Dec. 29, 2015, entitled "Access Node Architecture for 5G Radio and Other Access Network", naming Dimas R. Noriega et al. as inventors, which application is incorporated herein by reference.

BACKGROUND

Field of the Disclosure

This disclosure relates to a telecommunication system and more particularly to access network architecture of a telecommunication system.

Description of the Related Art

As telecommunication systems move into the next generation of network technology, for example wireless networks evolution to 5G, significant investment must be made in new hardware and software to provide the additional capacity required. The scope of the work is significant. For example, in one carrier's wireless network there are 50,000 to 100,000 access nodes that need to be upgraded to support 5G mobile telecommunication. By contrast a few thousands of core nodes are sufficient to support the above access points. To continue with the wireless scenario, the current understanding is that the future 5G network will be an evolution of the current 4G long term evolution (LTE) technology (but higher capacity) complemented with a tightly integrated mm wave layer for densification and capacity. The densification layer may increase the access node count by a factor of two or more.

Within current telecommunications networks, access and core nodes are built using a large set of hardware and software platforms. A wireless eNB is different from an x digital subscriber line (xDSL) digital subscriber line access multiplexer (DSLAM) or a cable Hybrid Fiber-Coaxial (HFC) headend. Core nodes themselves are built using a multitude of software and hardware platforms. For example, there is dedicated hardware/operating system (HW/OS) for a router, dedicated HW/OS for a mobility management entity (MME), and dedicated HW for a radio network controller (RNC).

FIG. 1A illustrates limitations of the current architecture from a network perspective. In particular, access nodes 151a, 151b, 151c, and 151d have dedicated respective central office hardware support 153a, 153b, 153c, 153d. Some known drawbacks for this architecture include application-specific hardware results in a one-to-one hardware to Network function relation. In addition, the network planning phase determines capacity. If actual demand is less than what was planned, there will be stranded capacity. If actual demand is greater than what was planned, there will be congestion. The one-to-one hardware to software mapping limits or prevents load sharing/load balancing.

FIG. 1B shows a high level block diagram of a legacy radio access network (RAN) Access Node currently deployed in 4G networks such as one of the access nodes 151a, 151b, 151c, or 151d. The Access Node 100 shown in FIG. 1 includes various functional blocks to implement the Access Node functionality. The functional blocks include a network interface block 101 that includes a network processor unit (NPU) to provide the necessary Internet Protocol (IP) transport functionality. A call processing block 103 may use a general purpose processor (GPP) with a proprietary software development kit. The radio section 105 includes functionality to convert IP packets to radio frames for the three sectors α, β, and γ by providing processing for lower layers of the seven layer Open Systems Interconnection (OSI) model. For example, the radio section 105 provides processing for the physical layer (PHY), media access control (MAC), and Radio Link Control (RLC) frame processing.

The radio section 105 is typically a proprietary block, implemented with specialized silicon such as various combinations of proprietary digital signal processors (DSPs), field programmable gate arrays (FPGAs), and/or application specific instruction processors (ASIPs). The various components typically run using a proprietary real time operating system (RT-OS). A switching matrix 107 such as serial rapid I/O (SRIO) provides connectivity at Gigabit rates between the different blocks, delivers the radio frames from the radio processing section 105 to the Common Public Radio Interface (CPRI) block 109, which in turn supplies the radio frames to the radio equipment (not shown) over the CPRI defined interface.

Current Access Nodes have different combinations of hardware, software, and instruction set architectures (ISAs) that differ from vendor to vendor and product generation to product generation. The various Access Nodes typically utilize multiple proprietary development tools for multiple ISAs that can be found in the current Access Node. For example, the ISAs may include the NPU ISA, GPP ISA, and the various ISAs used in the radio processing block 103.

FIG. 1C shows the well-known protocol stack and processing stages for a 4G eNB. The Packet Data Convergence Protocol (PDCP) provides header compression and decompression of IP data flows using Robust Header Compression (RoHC). The PDCP also provides ciphering and deciphering of user plane and control plane data. The Radio Link Control (RLC) provides data transfer management and the Media Access Control (MAC) layer is one of the two sublayers of the Data Link layer (L2) and manages allocation of radio resources for the uplink and downlink. The physical layer (PHY) provides the physical link and transport over the air interface to the User Equipment. RLC, MAC and PHY together are referred to as the "baseband" functions. GPRS Tunneling Protocol (GTP) includes both signaling and data transfer procedures. Encapsulating Security Payload (ESP) provides for secure IP communications. The UDP/IP stack provides the User Datagram Protocol (UDP) as the transport layer protocol defined for use with the IP network layer protocol. The eNodeB is coupled to the serving PDN gateway (SPGW) over the S1 interface.

As networks evolve to accommodate next generation capabilities, improvements in access nodes architecture as well an evolution in end to end architecture are desirable.

SUMMARY OF EMBODIMENTS

In order to provide enhanced capability and flexibility, an embodiment of an access node of a telecommunications system includes a front end unit to provide physical layer processing for the access node, the front end including one or more baseband processing units (BPUs). The BPUs perform floating and fixed point operations as part of the physical layer processing. A back end unit of the access node includes a plurality of general purpose processors to provide the data link layer and network layer processing. An internet protocol (IP) packet based communication link couples the front end unit and the back end unit to provide for data and control packets to be sent between the back end unit portion and the front end unit portion.

In another embodiment, a method is provided that includes processing data and control information of a telecommunication access node in a plurality of general purpose processing units system in a back end unit of the access node. The method further includes sending the data and control information over an IP packet-based communication system from the Front End Unit to the Back End Unit and performing physical layer processing of the data in baseband processing units in the Front End Unit and transmitting the data to one or more user equipment devices.

An access node of a cellular network includes a front end unit to provide physical layer processing and media access control (MAC) sublayer processing for the access node. The front end unit includes one or more baseband processing units to perform floating point and fixed point operations to support physical layer processing and one or more general purpose processors. A back end unit provides data link layer and network layer processing and includes one or more general purpose processors. An internet protocol (IP) packet based communication link couples the front end unit and the back end unit to allow for data and control packets to be sent between the back end unit and the front end unit.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Updating the various functional blocks to meet Software Defined Networks (SDN) and Network Function Virtualization (NFV) as well 5G requirements in Access Nodes that use different proprietary schemes could lead to more costly development, deployment, and maintenance cost phases. Further, proprietary approaches to the Access Node could limit the ability to achieve NFV and SDN architectures. Accordingly, an improved Access Node architecture is desirable to help develop, deploy, and maintain the next generation of network technology of special interest to wireless networks.

The Access Node's key function in a wireless network environment is to adapt core network transport to access network transport. Core network transport is based on high bandwidth, several 10GigE links between nodes, and low bit error rate transport media like fiber optics. On the other hand, Access Network bandwidth may be constrained to a few Gbps and the bit error rate is several orders of magnitude higher compared to the core network. To ensure bit rate, packet loss, delay and jitter guarantees (all together referred as Service Level Specifications), current carrier networks rely on the concept of a tunnel; a logical pipe between two communications peers.

To accomplish the core-to-access interworking adaptation, the Access Node performs the following steps: a) receives, from the core, end user IP packets encapsulated in a transport protocol based on IP over Ethernet, b) removes the transport layer protocol overhead c) queues for a few milliseconds the user packets, d) fragments, reassembles, concatenates, and encapsulates the user packets using a link layer protocol optimized to the transport media used by the access network (for example RLC used in wireless networks), and) forwards the user packets over the access media as link frames.

In embodiments describe herein, an end to end (server to host) communications link is composed of two segments with protocol interworking between one from server to Access Node (core tunnel) and one from Access Node to host (access network tunnel), thereby providing tunnel stitching between the core tunnel and the access network tunnel. For packets flowing from the server to the user, an interworking function reads the IP packets coming from the core tunnel and forwards them over the access tunnel using a L2 protocol optimized to the access network transport media, for example RLC for a radio network.

Figure 2A:
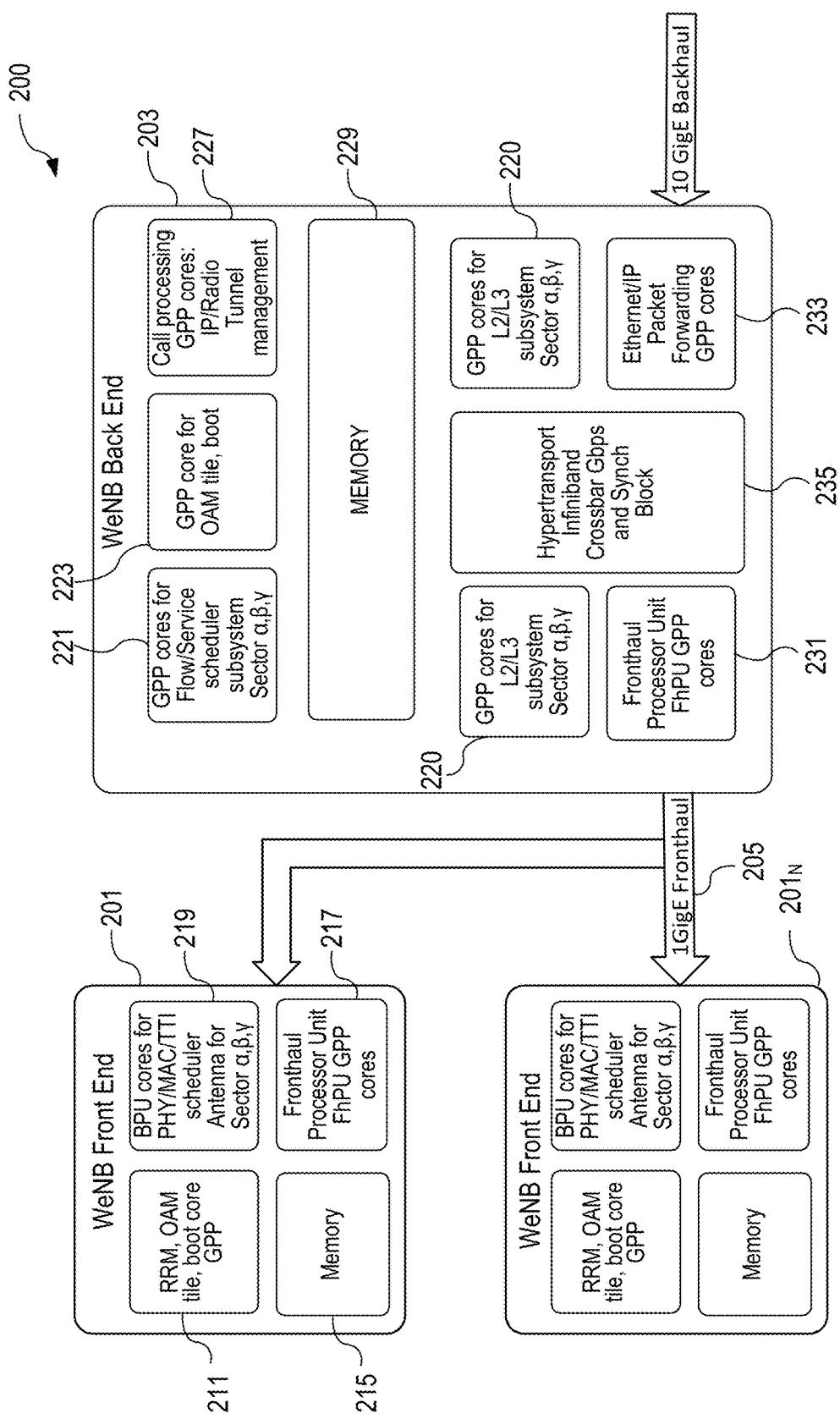
FIG. 2A illustrates the architecture for an evolved Wideband eNodeB (WeNB), 5G, according to an embodiment.

Referring to FIG. 2A, in order to provide enhanced capability and flexibility, and reduce expenses, according to an embodiment, an exemplary 5G Access Node 200, referred to herein as the Wideband eNodeB or WeNB, is partitioned into two subsystems, a Front End (FE) unit 201 and a Back End (BE) unit 203. The Front End Unit of the Access Node has one or more L1+L2 (baseband) processing units to provide physical layer and MAC layer processing. The Front End Unit is capable of executing a large number of fixed/floating point calculations over large data arrays because L2+L1 processing includes thousands of symbols processed simultaneously via algorithms like Fourier Transforms using Matrix operations in a time budget of a few microseconds. Such a high floating/fixed point performance is well addressed by vector or parallel class computing architectures. The Back End Unit portion has a plurality of general purpose processors to provide the same data link layer, network layer and above processing as well as call control functionality. Back End requirements are well addressed by current multicore GPP processors. The partitioned architecture described herein allows for improved hardware cost efficiency, improved capacity, improved performance, e.g., as an enabler for multi-site feature applications, and has minimal transport performance, capacity and cost impact.

The telecommunications industry is evolving to a network architecture based on a common Commercial Off The Shelf (COTS) hardware (HW), where each node's functionality is defined by software. COTS refers to purchasable building blocks (aka "components"), commercially available from multiple suppliers on the open market, having open and/or standardized interface(s). In the evolving network architecture, per service nodes are created as the user traffic materializes and is destroyed as the traffic demand fades. A node providing wireless services by day time may be reprogrammed to provide broadband fiber services at night time. Such flexibility is one key goal of the Software Defined Networks (SDN) and Network Function Virtualization (NFV) pillars. However, this suggests that the COTS hardware provides the processing power, reliability and flexibility to economically replace all the present specialized silicon implementations.

In order to minimize cost and maximize flexibility, it is desirable for an Access Node to include COTS hardware and open source software that support network function virtualization. A COTS-based telecommunications system that implements the SDN and NFV framework may address one the key shortcomings of current networking architectures, namely that some nodes become overloaded (for example Radio Access Nodes) while other nodes can be lightly utilized (for example IP routers, Wi-Fi access points). Henceforth, by avoiding or limiting purpose-designed hardware typically utilized in current generation wireless and wireline networks, significant savings can be achieved in deploying and maintaining the next generation network. Note that some hardware may be specifically designed for wired or wireless telecommunication network applications and still be utilized in embodiments of the architecture described herein.

One form of commercial COTS hardware that supports functionality required in a WeNB BE/FE that is the widely available is the general purpose processor (GPP) such as multi-core processors available from Intel (e.g., the Xeon processor), processors from AMD, or processors based on ARM architectures. The term "multi-core" refers to an integrated circuit where two or more processors have been attached for increased performance via multi-processing. Multiprocessing is a type of computation where several operations are performed simultaneously. Because of this basic principle, multiprocessing has become the dominant standard in computer architecture. As an example, GPPs that support the x86 instruction set architecture (ISA) can be used for the WeNB and support code portability. However, GPPs do not provide enough floating/fixed point processing capacity to meet all of the Access Node computing needs for some demanding access technologies such as LTE. For example, in order to provide the fixed/floating point required by a six sector LTE eNB, several dozens of multicore GPPs running at GHz rates are required. Such a design is not feasible, both from an economic or engineering standpoint (considering thermal and space requirements). In summary, even for 4G networks the processing needs associated with the physical layer (layer 1) cannot be adequately supported by GPP-based solutions.

The most intensive floating/fixed point computation requirements come from the physical layer (PHY also known as L1) of the telecommunications access network. The physical layer defines how the bits within the data packets connecting network nodes are to be transmitted. The bit stream may segmented so that a set of bits are grouped into a symbol, and the stream of symbols are then converted to a physical signal that is transmitted over a transmission medium. The physical layer may add redundancy bits to cope with transmission errors. Properties of the connectors, the frequencies, the modulation scheme, and coding scheme are specified within the PHY. The L1 layer is the lowest layer of the seven layer OSI model. The L1 functions constitute a large majority of the floating/fixed point processing required for a current Access Node.

L1 processing requirements are proportional to the bit rate of the aggregated end users. User speeds in next generation networks are expected to increase by 2 orders of magnitude, while the services' (data voice and video) call patterns may remain relatively stable even accounting for an expected rapid uptake in Machine Type Communication (MTC) services. The end result is that L1 processing requirements will grow at the fastest rate in next generation networks—faster than the data link layer (L2) (e.g., Radio Resource Management (RRM) and media access control (MAC)) and the network layer (L3) processing.

In the embodiment shown in FIG. 2A, the Baseband Processing Units (BPUs) perform the L1+L2 radio access network (RAN) floating/fixed computationally point intensive tasks typically found in the physical layer to offload the GPPs. A BPU is a high performance floating/fixed point many-core SoC (system on chip) and may encompass industry standard solutions like floating point co-processors arrays (FPCa), GPU (Graphic Processing Unit) as well the latest FPGA with integrated main controller unit. The BPU is specialized to support floating/fixed point compute-intensive, highly parallel computation and therefore designed such that more transistors are devoted to floating point operations (Data path) rather than data caching and flow control (Control Unit). The BPU is well-suited to address problems that can be expressed as data-parallel computations. This means that the same program is executed on many data elements in parallel, which is advantageous when the ratio of arithmetic operations to memory operations is high (i.e., it has "high arithmetic intensity"). Because the same program is executed for each data element, there is a lower requirement for sophisticated flow control, and because it is executed on many data elements and has high arithmetic intensity, the memory access latency can be hidden with calculations instead of big data caches. BPUs can come from many vendors, e.g., Intel (Xeon Phi), Nvidia, ATI, Altera, and Xilinx. BPUs support a Heterogeneous High Performance Computing (HPC) Architecture and BPUs provide sufficient real-time L1 processing capability as well as flexible software programmability. Driven by the global supercomputer community, the BPU has evolved into a highly parallel, multithreaded, multicore processor with high floating point computational power and high memory bandwidth. It is well suited to provide the processing power for the computationally intensive floating point single/double precision; the type of computations required by L1 within these type of access technologies. Over the past few years, BPU performance has increased well beyond GPP's performance and this trend is expected to continue. In embodiments, the BPU may be purposefully designed for L1 processing applications.

Upcoming next generation networks, for example 5G networks, will require processing power to be at least 2 orders of magnitude of current generation 4G networks: carrier BW will go up from 10 MHz to 100 MHz while the TTI (scheduling cycle) will shrink from 1 millisecond to under 100 microseconds. 5G networks will also be required to deliver new strict real-time services characterized by short response times (i.e. very low latencies on the order of microseconds) and high reliability, thereby enabling industrial control and traffic safety. All these demands translate into high processing capability, and such processing requirements can only be met when GPPs are complemented by the floating/fixed point performance provided by BPUs.

The BPU units may be attached to the main GPP via a fast link, e.g. PCI Express 16X, HyperTransport, InfiniBand or QPI. After the data packets received from the Front End Unit have been processed for transmission toward the user, the Front End Unit supplies radio equipment, including amplifiers and antennas (not shown) for transmission to user equipment.

To facilitate the use of BPUs, a Baseband Development Kit (BDK) may be offered as an open Application Program Interface (API). The BDK is a software library that provides 3GPP/IEEE wireless/wireline access network DSP routines like the Inverse Fast Fourier Transforms (IFFT), FFT, error correcting codes, etc. The BDK will ensure L1+L2 code portability; that is, it will act as an abstraction layer. The BDK can support multiple silicon vendors, thus allowing BPUs to perform DSP and special processing related algorithmic instruction capabilities in a wide array of silicon solutions like GPUs, FPCa, FPGAs, and ASIPs without changes to the program code.

Referring still to FIG. 2A, the WeNB Front End Unit 201 hosts floating point/fixed point intensive functions like L1 and the antenna subsystem, including the time/frequency synchronization subsystem as well the radio frequency (RF) interface. The WeNB Back End Unit 203 hosts more typical radio network control type functions, which are less demanding from a floating/fixed computational standpoint. As shown in FIG. 2A, the WeNB Back End Unit 203 may support multiple WeNB Front End Units 201 to $201_N$. As described more fully herein, multiple WeNB Front End Units may be served by a cluster of WeNB Back End Units to allow resource pooling in the Back End Unit.

The WeNB FE-BE partitioning is supported by a packet-based communication channel 205 that supplies user data packets from the Back End Unit to be transmitted to User Equipment (UE) by the Front End Unit. The channel also carries channel scheduling information from the Front End Unit to the Back End Unit relating to aspects such as channel conditions, call status, or other information necessary for the Back End Unit to perform its required scheduling functions. In addition, the packet-based communication channel 205 supplies data received by the Front End Unit from UEs and destined for the back haul network, e.g., packets related to a particular voice or data session of the UE.

For traffic from the network to the UE, the Back End Unit terminates the core IP tunnels and originates the access network tunnel between the Access Node and the UE. User data packets arriving over the core IP tunnel are then forwarded to the UE over the access network tunnel. Packet forwarding is coordinated by the flow/service scheduler built into the Back End Unit (see 221 in FIG. 2A). The flow/service scheduler utilizes a weighted Fair Queuing (WFQ) discipline implementation. WFQ Scheduling takes into account core IP tunnel service requirements, as well any access network instantaneous capacity information received from the Front End Unit, by assigning a time window to forward a certain amount of bytes. For example, a voice tunnel using the AMR codec must be scheduled to forward a voice packet, 40 bytes long, every 20 msecs with a packet loss of less than 1%. On the other hand, a video call core tunnel must be scheduled to forward a packet, averaging 300 bytes long, every 50 msecs with negligible packet loss. The TTI scheduler, part of the Front End software, which belongs to the Bulk Transfer family of schedulers, is shown in the Front End module 219 in FIG. 2A. The TTI schedules up to K Layer 1 frames at any scheduling opportunity, where a frame belongs to one of the active flows within the flows/service scheduler. The flow/service scheduler serves a few hundreds of users (tunnels) while the TTI scheduler serves a few tens of flows at every TTI. Since the TTI is much faster, at the end all flows are served. If N is the number of active flows in the flow scheduler, and K the number of frames served by the TTI scheduler, K<<N. The TTI scheduler uses the window and bit rate constraints requested by the flow scheduler in the Back End, plus any knowledge from the RF environment to make the final selection about the scheduling opportunity to use. Note that the TTI scheduler rate is two orders of magnitude faster than the flow scheduler.

4G RAN uses SONET (synchronous optical networks) type protocols like CPRI, OBSAI, ORI, or ROE when the eNB is deployed in a split architecture where the baseband remains in a hub location but the remote radio heads (RRH) or digital distributed antenna systems (DDAS) are distributed over a wide area. In contrast, embodiments described herein utilize an end to end packet network architecture. As such, embodiments include the Wideband LTE Frame Protocol (wLFP) protocol between the Front End Unit and the Back end Unit. The wLFP is based on standard IP/Ethernet.

Figure 1A:
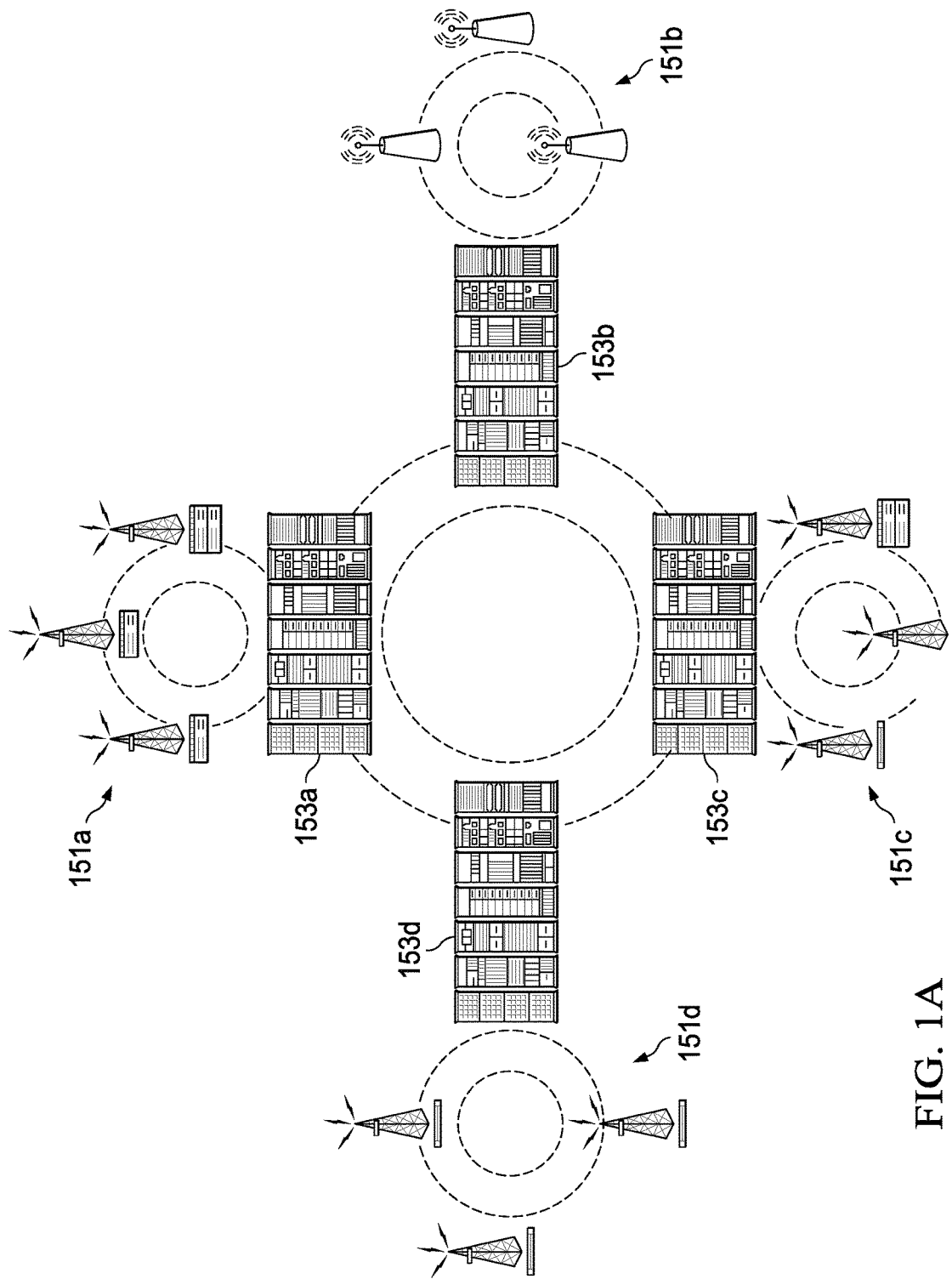
FIG. 1A illustrates limitations of the current architecture from a network perspective.
Figure 1B:
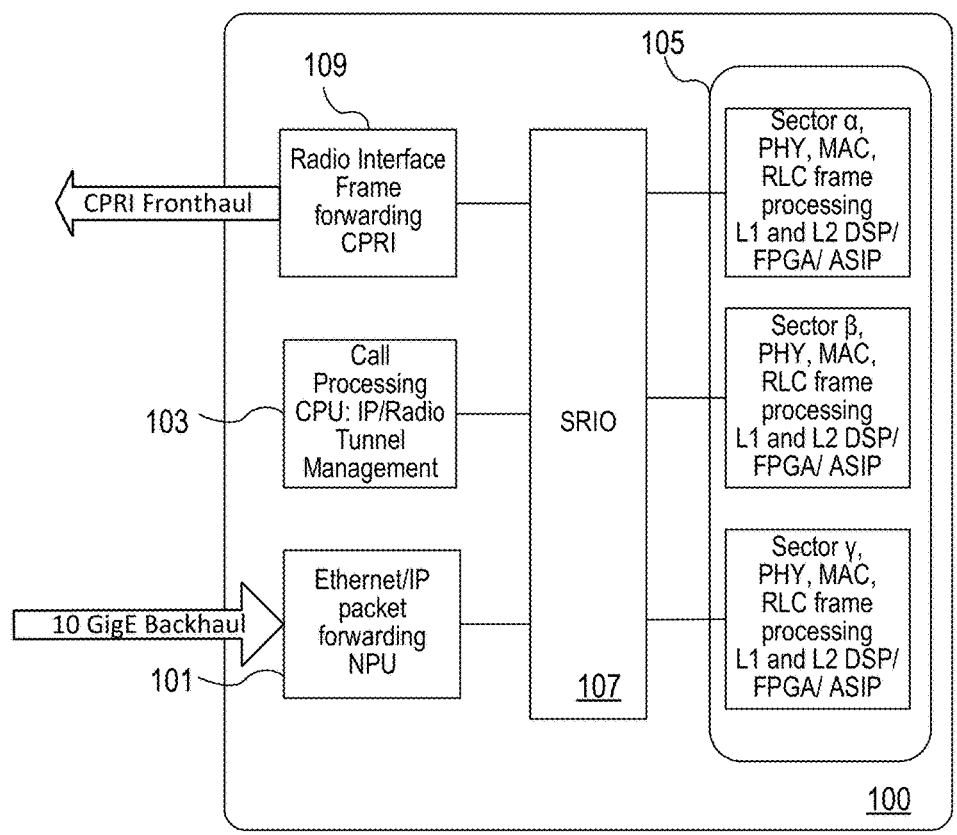
FIG. 1B illustrates the architecture for an Access Node, legacy LTE 4G.
Figure 1C:
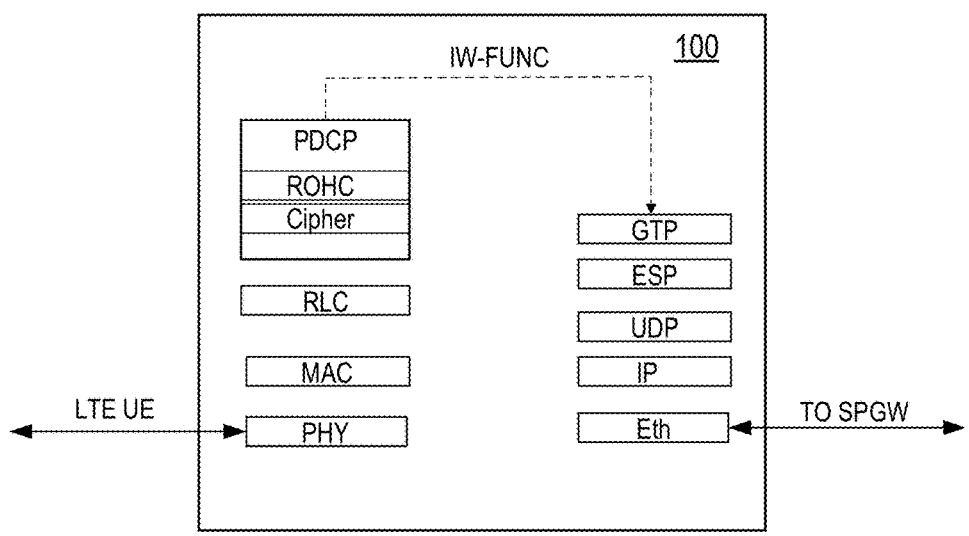
FIG. 1C illustrates the user plane protocol stack for the 4G Access Node of FIG. 1A.
Figure 2B:
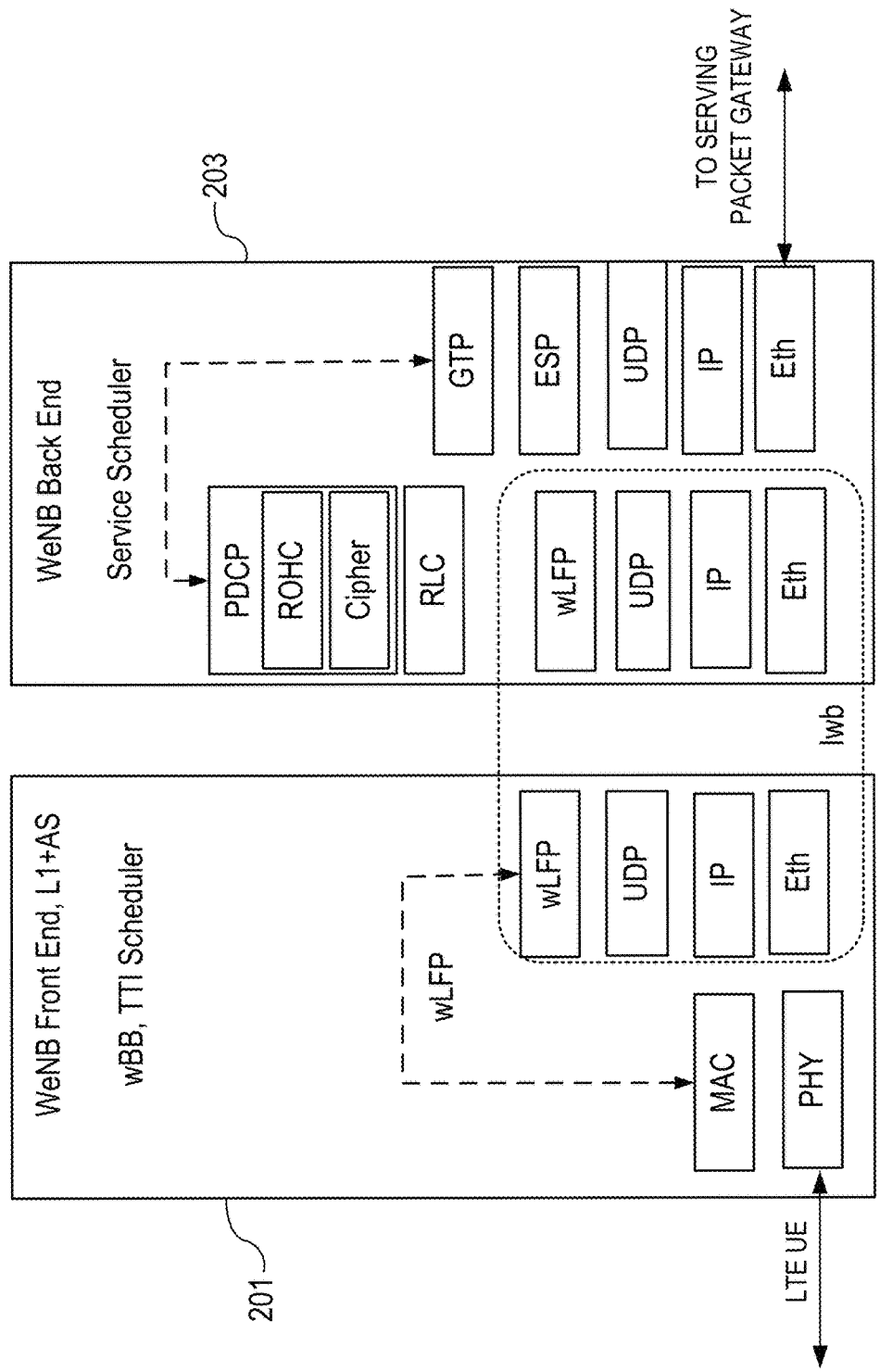
FIG. 2B illustrates a new user plane protocol layer in the WeNB.

Referring to FIG. 2B, the protocol stack for a WeNB user plane is illustrated. The protocol stack reuses layers from the 4G protocol stack shown in FIG. 1C but includes an additional protocol layer to cope with the potential geographical distribution, i.e., having the Front End and Back End at different sites. In particular, the communication interface 205 between the Front End Unit 201 and the Back End Unit 203 is implemented using the Wideband LTE Frame Protocol (wLFP). In an embodiment the wLFP uses standard User Datagram Protocol/Internet Protocol (UDP/IP) as the network layer (layer 3 in the seven-layer OSI model). The wLFP complements IP/Ethernet with services like Tunnel ID, TID managements, per tunnel flow control, and error recovery. Since a BE may subtend several FEs, wLFP may provide broadcast/multicast services as well as assisting with handovers and Coordinated Multiple Point (COMP) techniques. While the user plane communications stack uses the wLFP, control information exchange (both signaling as well as information between schedulers) may continue using the Stream Control Transport Protocol (SCTP) protocol. That is, SCTP over IP may be used between the Front End Unit and the Back End Unit to exchange status information as well signaling.

In certain embodiments, the weNB Front End Unit and Back End Unit are collocated, for example C-RAN morphologies that address ultra-dense fiber rich networks. In this case, the wLFP may provide a virtual service point that connects over a native board interconnect such as PCIe or HyperTransport. This solution allows the Front End Unit and Back End Unit architecture to be used even though the Front End Unit and Back End Unit are hosted by the same hardware. In that case communication interface 205 (FIG. 2A) would be physically a PCIe or HT link, but still supports the wLFP. In embodiments where the Front End Unit and Back End Unit are not collocated, the wLFP interface provides sufficient bandwidth to support the required service attributes in terms of performance required by the Front End Unit. In an embodiment, a 10GigE Ethernet link may provide the necessary bandwidth and meet the SLS service level specifications for transport between the Front End Unit and the Back End Unit.

Referring again to FIG. 2A, the high level block diagram illustrates an example partition for a 5G access node. The functions of the various blocks shown in the Front End Unit 201 are known and the description is intended to provide an example of the partition between functions in the Front End Unit 201 and the Back End Unit 203 rather than a detailed description of their operation. A GPP 211 hosts Operations and Management (OAM), Radio Resource Management (RRM), and boot core functionality. A memory module 215 stores the data and control software utilized by the Front End Unit GPPs and BPUs. While only one memory module is shown, the memory module may be provided in various appropriate locations, for use by the various GPP and BPUs found in the Front End Unit. A GPP 217 provides functionality for the front haul communications interface. Most of the Front End Unit processing is performed by the BPU cores 219 providing for PHY/MAC functionality, TTI scheduling, and intelligent antenna subsystem for sectors $\alpha$, $\beta$, $\gamma$. The BPU 219 may be formed by one or more many-core GPUs or FPCas. Typical operations (or series of operations) performed by the BPU cores 219 in the Front End Unit 201 of a WeNB include convolution, FFTs and IFFTs, turbo coding/decoding, multiple input multiple output (MIMO) antenna processing, error detection on the transport channel and error indication to higher layers, forward error correction (FEC) encoding/decoding of the transport channel; Hybrid Automatic Repeat Request (HARQ) soft-combining; rate matching of the coded transport channel to physical channels; mapping of the coded transport channel onto physical channels; power weighting of physical channels; modulation and demodulation of physical channels; frequency and time synchronization; radio characteristics measurement and indication to higher layers; transmit diversity; beam forming; and RF processing. The radio conditions measurements produced by the RRM (Radio Resource Management) function are used to select the optimal modulation and coding settings. While the total number of bits is fixed on a per frame basis, the ratio of information bits to redundancy bits is calculated for every transmission in an attempt to maximize the throughput by mean of minimizing bit error rate and retransmissions. One advantage of the partitioning is that a front end may be collocated with the analog processing components on top of radio tower and provide a zero footprint capability in that no additional space is required for the front end components. Note that current antenna subsystems (4G) include some DSP/FPGA processing to execute some functionality like DPD (digital predistortion) and DDC (digital down converter). The DSP/FPGA processing then supplies DAC digital to analog converters to drive the analog power amplifiers or receive digital signals from analog to digital converters in the receive path. In embodiments described herein the DPD/DDC/DUC and similar processing is executed in the front end unit by a BPU, thus simplifying the antenna subsystem. The partitioning provides additional advantages. For example, front end floating point processing allows low latency floating point processing operations to be moved closer to the user equipment. Performance is less dependent upon stringent (and expensive) front haul transport latency requirements. Sending less non-user-data (i.e., overhead) over the front haul results in reduced transport capacity and cost.

FIG. 2A also illustrates major functional blocks of the Back End Unit 203. The functional blocks of the Back End Unit are known in the art and their description is provided here to help understand the partitioning between the Front End Unit 201 and the Back End Unit 203. The functionality in the Back End Unit may be implemented using a plurality of GPP cores. L2 and L3 WeNB layers can be supported on GPPs 220. The Back End Unit also includes the flow scheduler subsystem for the antennas sections $\alpha$, $\beta$, $\gamma$ 221, OAM tile and boot functionality 223, and call processing functionality 227. The call processing functionality includes the RRC processing subsystem, whose main function is tunnel management, i.e. radio bearer setup and release as well managing the switching between LTE bearers and Radio bearers (Virtual Circuit switching). The RRC subsystem also manages mobility, i.e. handovers between cells as well to other layers. Note that while separate GPPs are shown, the multiple functions may reside on one or several GPPs.

The Back End Unit 203 also includes memory 229 to store data and software necessary to provide the functionality described. GPPs also provide the front haul processor unit 231 to communicate with the Front End Unit 201 over communication channel 205 and the backhaul processor unit 233 to communicate with the backhaul network. The backhaul processor unit 233 supports backhaul traffic in the form of UDP/IP packets that are received/sent from/to the network backhaul. Typical PHY (physical level) interfaces on the backhaul are 10GigE optical/electrical interfaces. The backhaul processor unit 233 may be used to decode/encode the transport network IP/Ethernet protocols including UDP at L3. If IPsec is enabled at the transport layer, IPsec encryption/decryption and key management may be provided by the processor units 233 or by another processor unit. A high speed crossbar switch 235 may be used to communicate between the various functional blocks.

Figure 3:
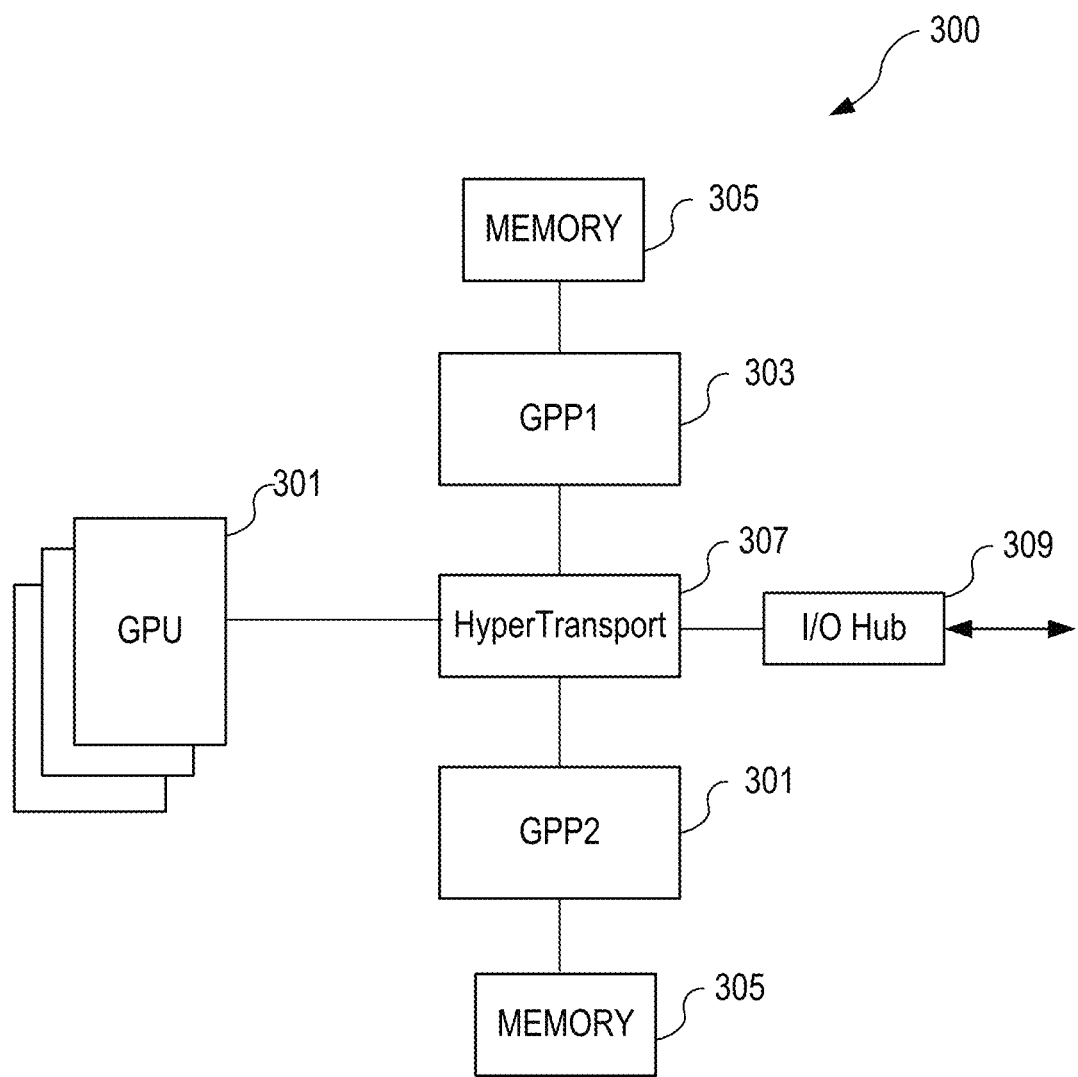
FIG. 3 illustrates an example of a WeNB configuration, Front End hardware module.

FIG. 3 illustrates a high level block diagram of an exemplary single WeNB Front End Unit blade 300 that may be utilized to implement a Front End Unit 203. The Front End Unit blade 300 includes a plurality of graphics processing units (GPUs) 301 that perform the bulk of the fixed and floating point processing required for L1. In addition, several general purpose processing (GPP) units 303 and memory 305 are provided to provide functionality associated with radio resource management and front haul communications, for example. A HyperTransport link 307 or other suitable high speed interconnect may be used to couple the various components in the Front End Unit together. The I/O Hub 309 provides communication with other Front End Units as well as the communications link to the Back End. The number of Front End Unit blades can be provisioned based on traffic engineering considerations. A shelf including multiple blades may be used to provide sufficient processing power for large venues like shopping centers.

Figure 4:
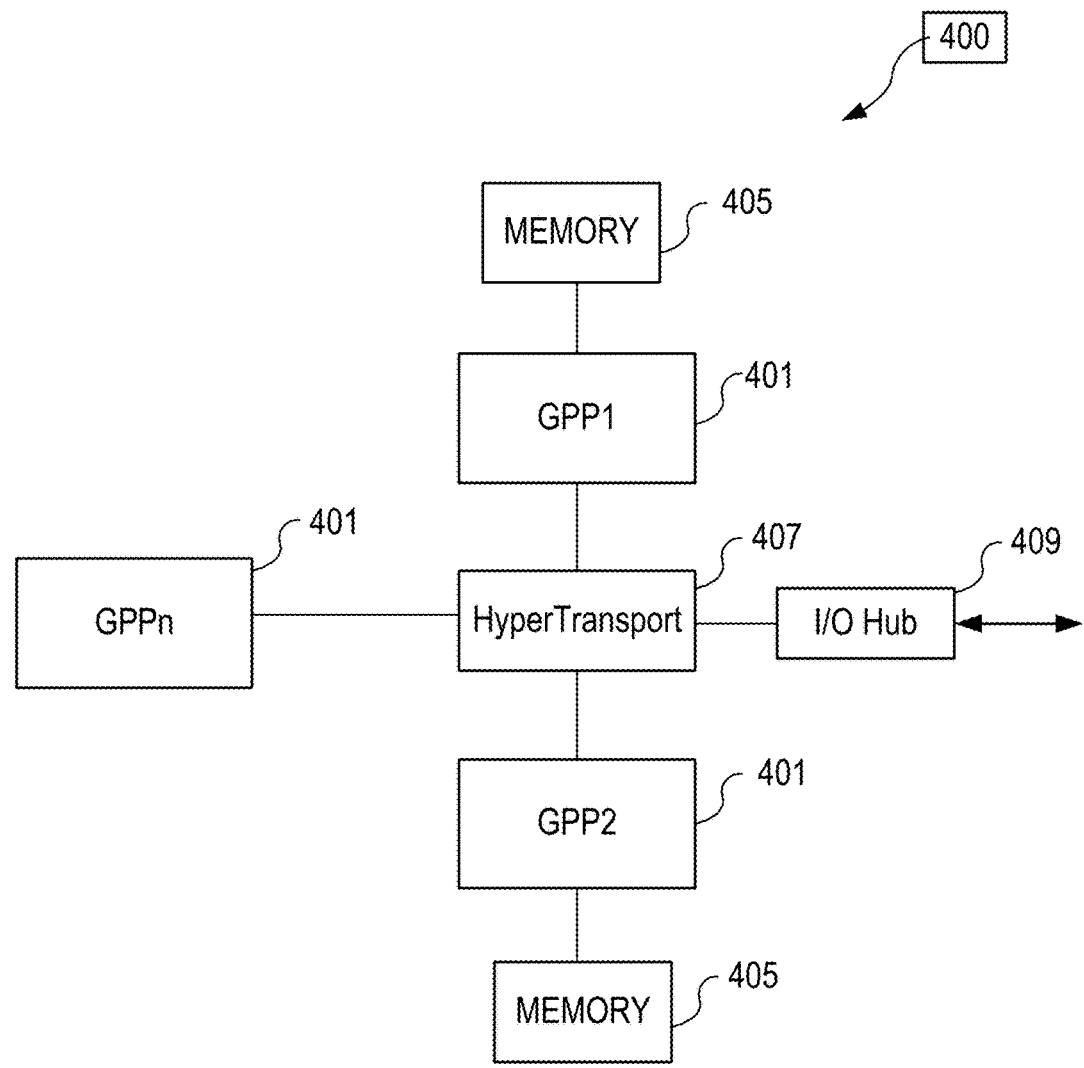
FIG. 4 illustrates and example of a WeNB configuration, Back End hardware module.

Referring to FIG. 4, a high level block diagram of an exemplary WeNB Back End Unit blade 400 is illustrated. The blade 400 includes a plurality of GPPs 401 (GPP1 to GPPn) interconnected by a HyperTransport link 407 or other suitable high speed interconnect, memory 405, and an input/output hub 409 coupled to a high speed interconnect such as InfiniBand. Expected WeNB Back End Unit configurations include a single blade as shown in FIG. 4, a shelf including multiple blades, and a rack including multiple shelves that may include hundreds of blades allowing for significant pooling of Back End Unit resources.

Partitioning the WeNB into Front and Back End Units allows for Back End Units to be clustered like a traditional data center based on blade servers, in a cloud-based technology center. Software modules are referred to as Virtual Machines in the context of the Network Function Virtualization framework. Some key advantages of such a cloud-based technology center architecture allows the use generic processing elements (PEs), e.g., GPPs, or a small number of variations of PEs, to address a broad range of computing applications including the WeNB back end units. Per-service capacity is configured based on demand. More capacity for a given task is created by adding one or more virtual network function (VNF) instances that perform that task. If the actual demand is greater or less than what was planned, VNFs can be added or removed.

Figure 5:
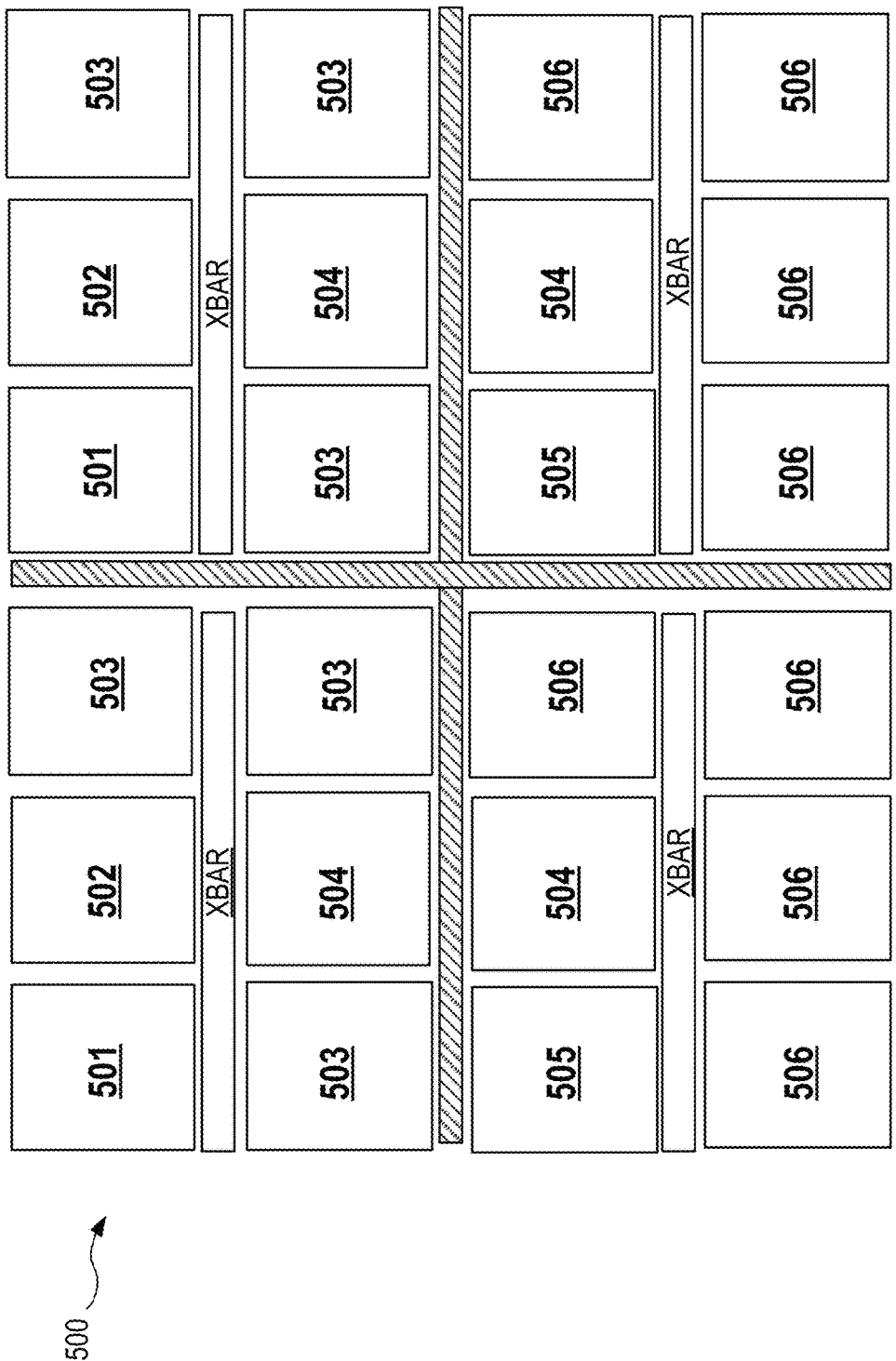
FIG. 5 illustrates an example of a "cloud" rack housing several WeNB hardware modules in a "blade" configuration.
Figure 6A:
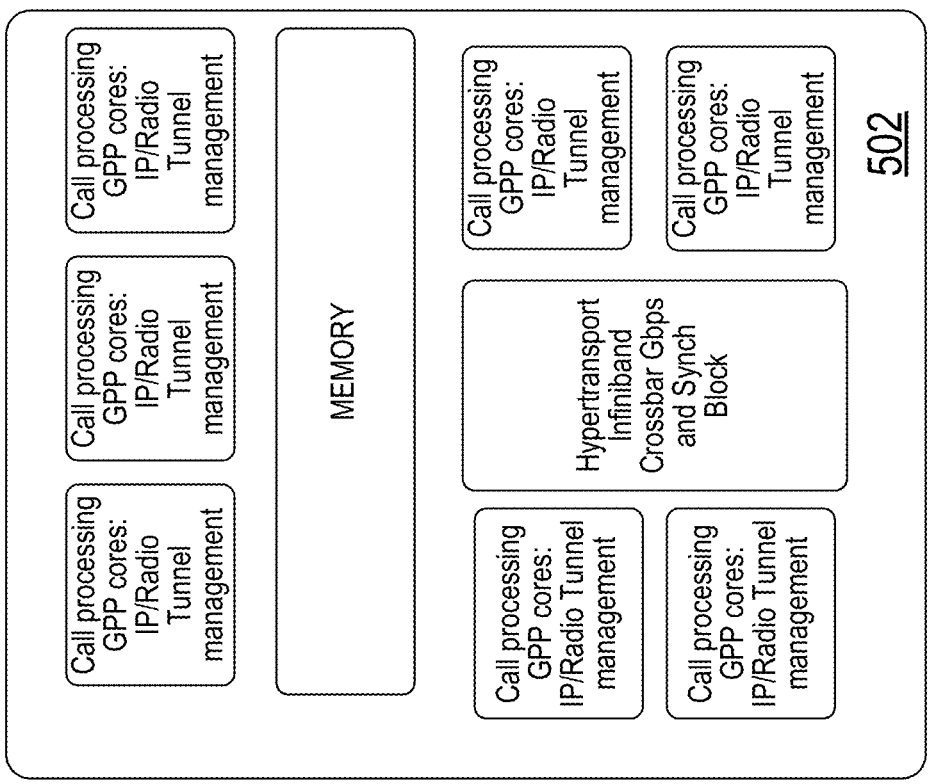
FIG. 6A-6F illustrate various personalities that may be associated with processing units in the rack of FIG. 5.
Figure 6B:
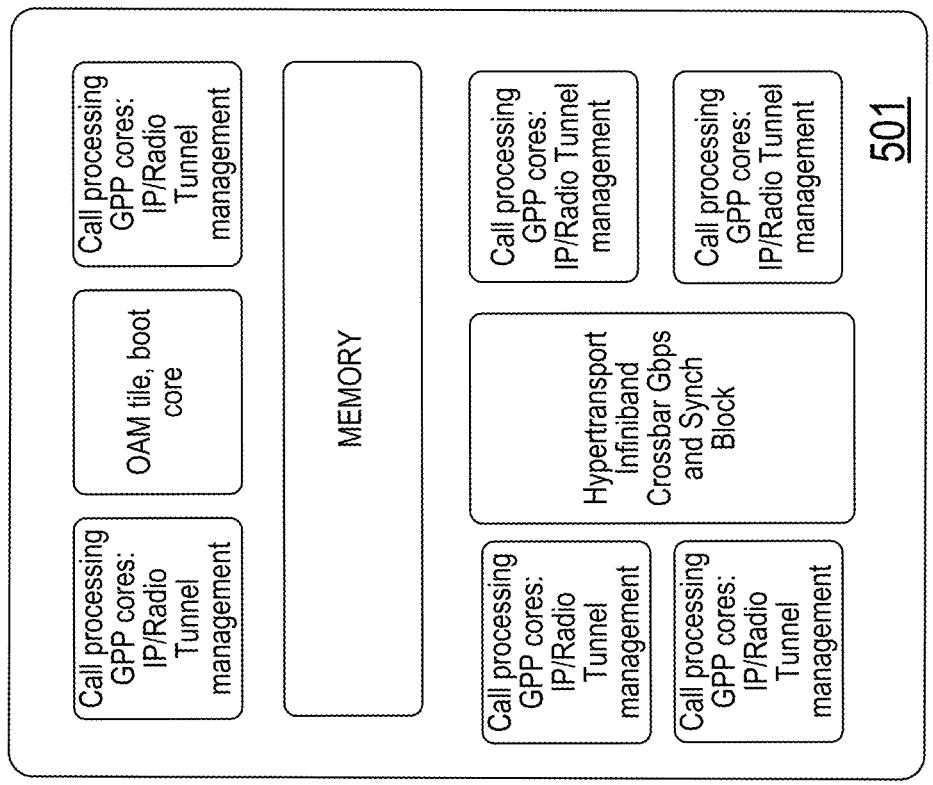
Figure 6D:
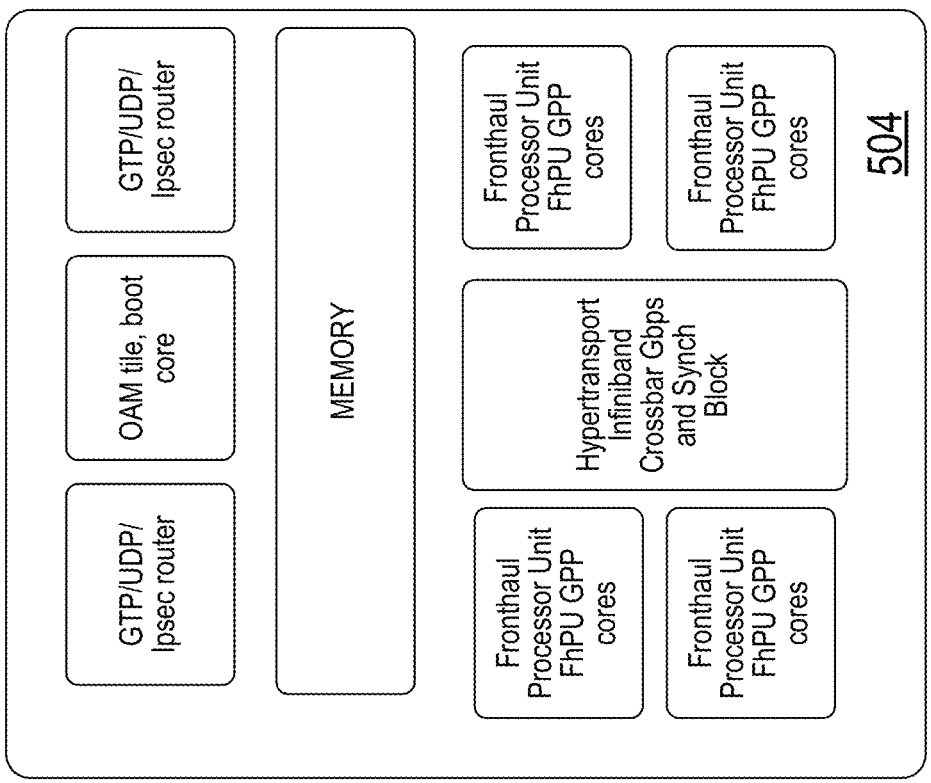
Figure 6C:
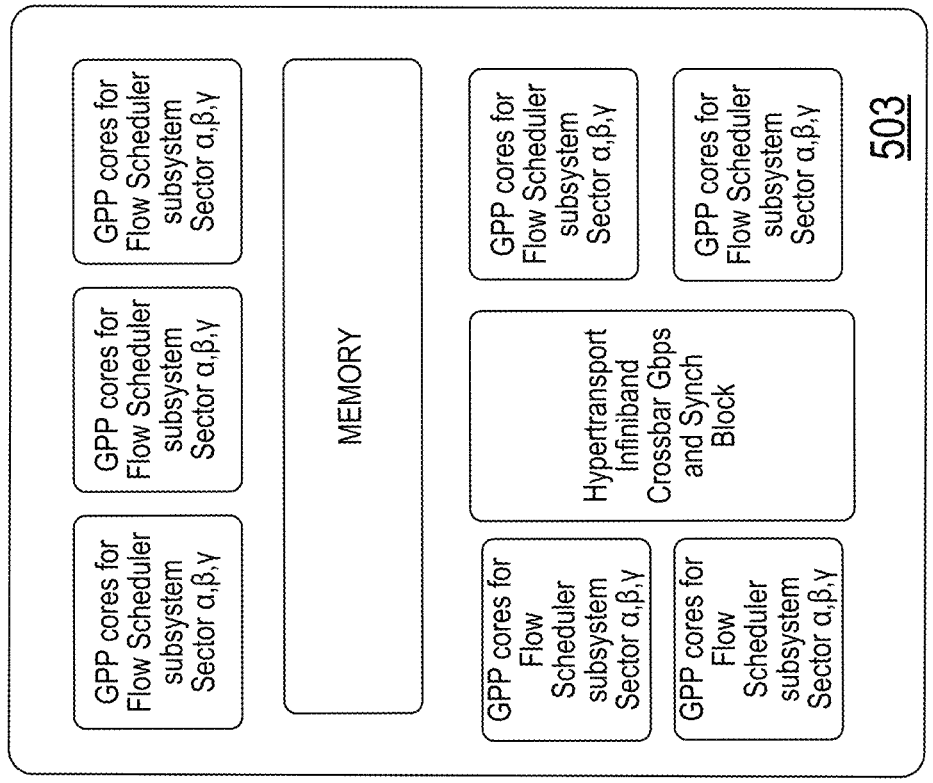
Figure 6F:
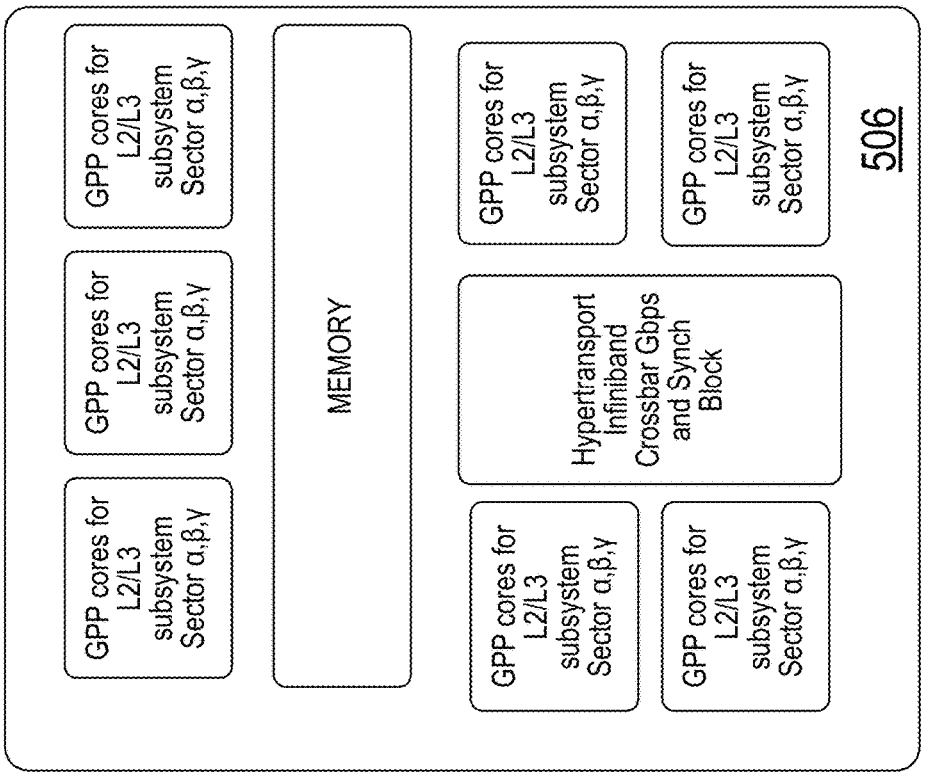
Figure 6E:
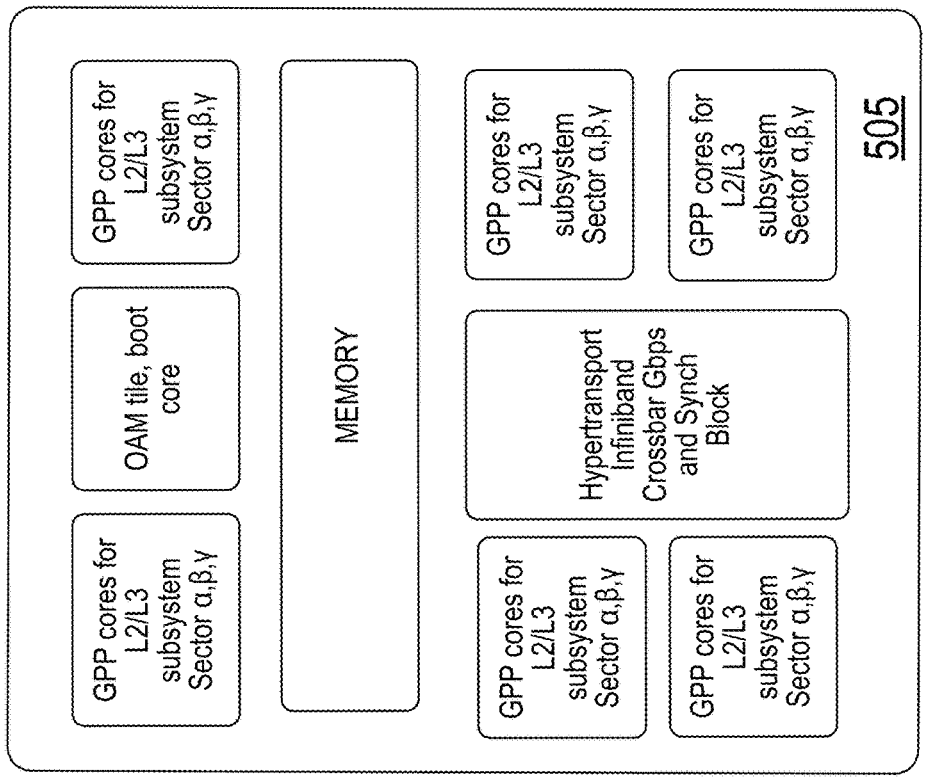

The back end unit blade shown in FIG. 4 can be used to implement resource pooling providing the foundation for network function virtualization (NFV) and software defined networks (SDN). Referring to FIG. 5, an example data center rack 500 illustrates a possible software partitioning, virtual machine binding example for the rack 500. The WeNB Back End Unit GPP cores execute L2, L3 functionality as well most of the control plane. A real time operating system RT-OS plus a kernel hypervisor may be used to manage the NFV/SDN, software and personality of each GPP cores 501 to 506. The software personality may be dynamic, load dependent, instantiated as demand rises and destroyed as demand fades. That helps ensure there is no overload and that there is no stranded capacity dedicated to a Front End Unit that does not require services, so that resources may be reallocated as other demand arises. FIG. 5 shows six separate software personalities loaded into 24 multicore GPPs. Each of the cores are coupled to memory and utilize a gigabit crossbar switch implemented as InfiniBand or HyperTransport links. The individual personalities of each GPP core are shown in FIGS. 6A-6F.

For core personality 501 (FIG. 6A), most of the functionality of the GPP core supports call processing except for a small portion allocated to OAM tile and boot core functions. For core personality 502 (FIG. 6B), the GPP processing is devoted entirely to call processing and IP/Radio tunnel management. For core personality 503 (FIG. 6C), the GPP processing is for flow scheduler tasks. For core personality 504 (FIG. 6D) the core processing tasks include GPRS Tunneling Protocol (GTP)/UDP/IPsec, OAM tile and boot and front haul communication tasks. IPsec refers to encryption/decryption and key management used in secured transmissions. For core personality 505 (FIG. 6E), the core processing tasks support L2/L3 tasks. For core personality 506 (FIG. 6F), the core processing tasks support L2/L3 tasks.

The partitioned architecture described herein can either be distributed at each cell site, or multiple cell sites can be pooled (centralized) if they are sufficiently close, since the architecture provides the necessary interfaces to share resources across local/remote processing nodes. A small WeNB Back End Unit may serve a few WeNB Front End Units then allowing a seamless upgrade of current LTE cell sites but also to serve small isolated service areas. A large WeNB Back End Units may use to pool services across a large geographical area. Back end pooling can allow hundreds of Front End Units to be supported from a single pooled location and provide significant economies of scale due to efficiency improvement. Such approach provides the maximum flexibility since it allows transport versus processing cost optimization. Back End pooling results in savings because absent of pooling, each Back End Unit has to be sized to adequately support peak processing for the matching Front End Unit. However, each WeNB FE does not have peak processing requirements at the same time due to the fact that call holding times are in the order of a few seconds and calls are randomly distributed. Thus, rather than each WeNB Back End Unit having to support the aggregated peak rates for its subtending WeNB FE, the Back End pool needs to support the aggregate sustained rate of the Front End Units subtending the WeNB BE pool during the assigned time period. Experimental measurements shows that at the WeNB FE level, the ratio Peak/Sustained~10. Furthermore, to the extent the service demand occur at different times for different WeNBs—e.g., downtown serving WeNBs may be more heavily loaded during daytime and residential serving WeNBs may be more heavily loaded at night—additional savings can be achieved by pooling savings. While pooling may be particularly effective in dense urban environments, the partitioned architecture described herein provides the flexibility to also support WeNB BE+FE collocation in less dense environments.

Back end pooling provides opportunities for improved network function and reduced cost. For example, the use of commercial off the shelf hardware in the back end pools reduces costs as well as providing improved capacity and efficiency. Back end pooling also provides the opportunity for common coordination/routing point for multi-site capacity and performance enhancement features. For example, pooling can provide enhanced inter-cell interference coordination (ICIC). Pooling facilitates carrier aggregation between the pooled back end, multiple front ends (different sites, frequencies and technology layers), and the user equipment. Pooling can enhance adaptive scheduling for handover between multiple front-ends and provide more effective collaborative multi-point (COMP) scheduling in which redundant/collaborative packets are sent, received, and combined by multiple front-ends per UE call.

Multi-site feature capabilities described above including ICIC, carrier aggregation, adaptive handover scheduling, and COMP scheduling are currently supported between non-pooled baseband processors that communicate/coordinate over the X2 interface. Unfortunately multi-site feature capabilities utility and gain are relatively limited by the capacity and latency of the X2 transport (metro Ethernet) between the non-pooled baseband processors. For example per-TTI frequency coordination between groups of cell sites over X2 increases the transport overhead for these cell site groups (and thus less transport capacity for user data) and are less adaptive/real-time due to the sub-optimal latency of the typical metro Ethernet architecture and quality of service (QOS).

In contrast, for pooled back end processing, each access node back end associated with a cell site is a virtual instance running on the same pool of processors used for other access nodes associated with other cell sites. For pooled environments, inter-site coordination can utilize an application programming interface (API) between multiple back-ends running on the same COTS processor pool. That coordination path over high speed interconnects in the pooled environment is not dependent upon nor sensitive to inter-site transport capacity and latency as is currently the case for the X2.

As an example of enhanced adaptive handover capability provided by the pooled back end environment consider dynamic COMP between the old and new site handover pair. Rather than hard-switch the radio path from old to new cell via X2 handover, dynamic handovers can adjust the COMP transmission ratio of packets sent by old versus new site. Before handover all packets are sent and received by the old site. During handover packets are sent by a combination of old and new site according to a ratio based upon relative path loss (for example). After handover all packets are sent and received by the new site. The dynamic COMP transmission ratio is much easier to coordinate real-time between virtual back-ends on the same COTS processor pool as compared to coordination over X2 via metro Ethernet.

It is desirable for an Access Node to be defined by software, e.g., the ability to change the Access Node function from 5G LTE to wireless local area networks (IEEE 802.11) to Ethernet passive optical network (ePON) depending on the actual service demand. Of course, power amplifiers, analog transceivers, and other transport media dependent functions remain unique to the access node. A common scenario for today's network nodes is the existence at a given moment of nodes with stranded capacity and overloaded nodes, since the static planned capacity does not match the actual traffic, which can change dramatically over time. The more that various types of wireless and wired access nodes can share processing resources, the less likely stranded capacity or overloaded nodes will be present in the network.

Figure 7:
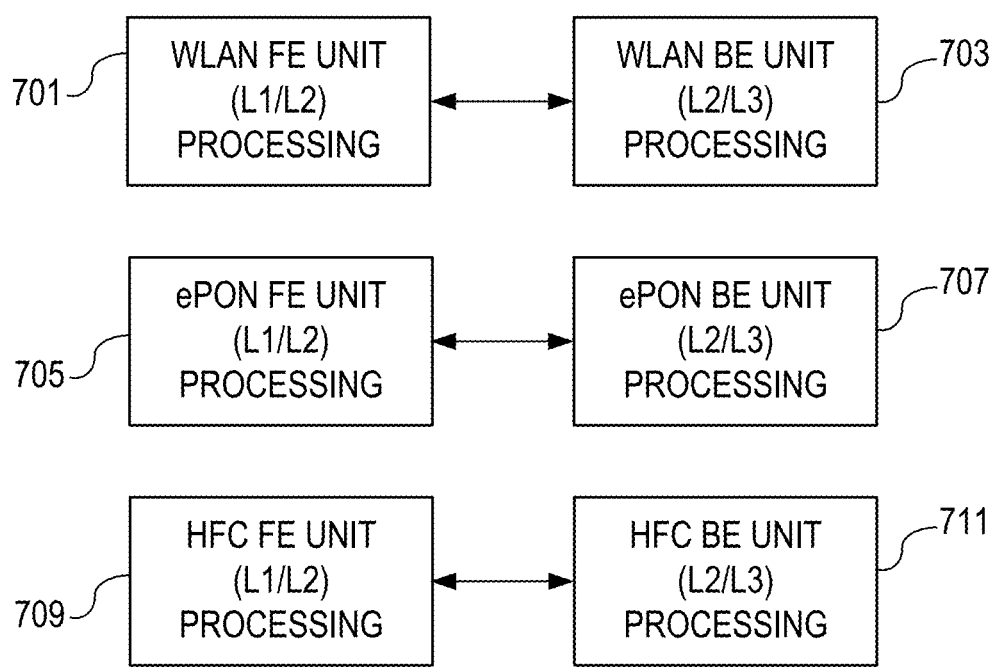
FIG. 7 shows the application of access node partition architecture to other wireline and wireless access nodes.

In addition to radio Access Nodes based on 3GPP standards the access node partition principles are applicable to other access nodes such as wireless local area networks (WLAN) that operate in accordance with IEEE 802.11, wireline Access Nodes, ethernet passive optical network (ePON) fiber nodes, cable HFC nodes, etc. The term "access node" is intended to apply to all such access node functions in a communications network including 802.11 access points. Thus, referring to FIG. 7, the L1/L2 dominated processing associated with an IEEE 802.11 access point may be located in a WLAN front end 701, while higher level L2/L3/L4 processing is handled in the backend WLAN backend 703. Similar partitioning may be used for ePON fiber node front end 705 and ePON fiber node back end 707. FIG. 7 also shows the example of an HFC front end 709 and an HFC back end 711. In all of the partitions shown in FIG. 7, the FE and BE may be coupled using the wLFP and collocated and located separately. Thus, the access node partition architecture applies to a variety of wireless (e.g., 5G, WLAN) and wired (e.g., wireline, ePON, HFC) access nodes.

To the extent possible, pooled back ends may serve more than one kind of access node to maximize resource use and flexibility as demand ebbs and flows for different types of telecommunication services. Thus, for example, a portion of a 5G back end pool may be utilized to support ePON fiber nodes when available by using different software in available backend GPPs. In addition pooled back ends can enable cross technology coordination mechanisms that are unavailable today. For example, many cross-technology combinations (LTE and WiFi, for example) have no cross-technology coordination mechanism, such as the x2 interface used by eNodeBs as a coordination mechanism. The pooling of virtual back ends that support multiple access technologies provides a new cross-technology coordination mechanism that does not yet exist.

Having the front end implemented with BPUs and GPPs allows for a fully programmable PHY layer in contrast to the current approach where the PHY is predominantly implemented in dedicated (non programmable) hardware. For example, it is possible to change the access node functionality from LTE to an 802.11 WLAN by reprogramming the front end. Thus, front end units may serve multiple L1/L2 level types of processing and drive different analog portions to support different wired or wireless network components.

Figure 8:
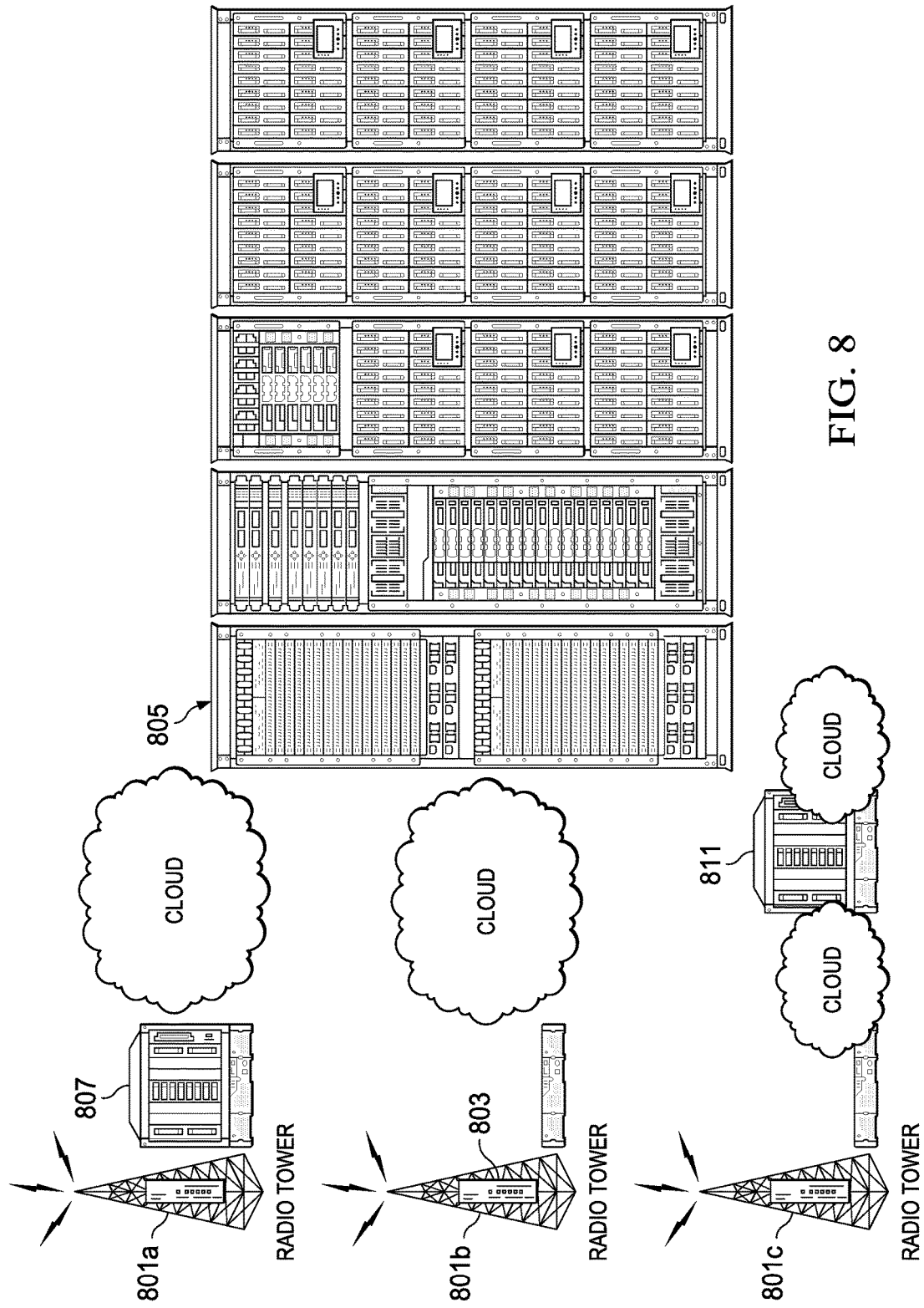
FIG. 8 illustrates an example network architecture incorporating the access nodes described herein.

FIG. 8 illustrates an example network architecture illustrating how the access nodes may be incorporated herein. As shown in FIG. 8, radio towers 801a, 801b, and 801c provide wireless communication with user equipment (not shown). In one aspect of the architecture, a zero footprint front end 803 is located in the radio tower while the back end is supplied in a data center 805. In another embodiment, for radio tower 801a, the back end 807 may be located in a remote location closer to the radio tower 801a rather than in data center 805. In still another example, the back end for the access node that utilizes radio tower 801c may be located at an intermediate satellite location 811, which in turn may be coupled to the data center 805 that performs core network functions in support of the access node.

Thus, aspects of partitioning of WeNBs have been described with the use of GPPs and BPUs. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. An apparatus comprising:
   a first front end unit to provide physical layer processing for an access node of a telecommunications system, the first front end unit including one or more baseband processing units to perform floating point operations as part of the physical layer processing;
   a virtual back end unit including a plurality of general purpose processors to provide data link layer and network layer processing;
   an internet protocol (IP) packet based communication link coupling the first front end unit and the virtual back end unit to provide for data and control packets to be sent between the virtual back end unit and the first front end unit;
   a pooled back end providing the virtual back end unit and at least a second virtual back end unit supporting a second front end unit of a second access node, the pooled back end having a pool of processors to provide a first back end instance for the virtual back end unit and to provide a second back end instance for the second virtual back end unit; and
   wherein during handover from the access node to the second access node, the virtual back end unit and the second virtual back end unit adjust a collaborative multi-point (COMP) transmission ratio of packets sent by the access node and the second access node by communicating between the virtual back end unit and the second virtual back end unit in the pooled back end.

2. The apparatus as recited in claim 1, wherein the physical layer processing includes turbo encoding and decoding.

3. The apparatus as recited in claim 1, wherein the first front end unit provides media access control (MAC) sublayer processing.

4. The apparatus as recited in claim 1, wherein the virtual back end unit is instantiated on one or more general purpose processors to perform call processing for calls served by the access node.

5. The apparatus as recited in claim 1, wherein the access node is a wireless access node.

6. The apparatus as recited in claim 1, wherein the access node is a wired access node.

7. The apparatus as recited in claim 1, wherein a plurality of back end units including the virtual back end unit are collocated and the plurality of back end units provide resource pooling to a plurality of front end units including the first and second front end units.

8. The apparatus as recited in claim 1 wherein the first front end unit further comprises one or more general purpose processors.

9. A method comprising:
   processing data and control information of a first telecommunication access node in a plurality of general purpose processing units in a first virtual back end unit of the first telecommunications access node;

sending the data and control information over an IP packet-based communication system from the first virtual back end unit to a first front end unit;

performing physical layer processing of the data in one or more baseband processing units in the first front end unit and transmitting the data to one or more user equipment devices; and during handoff from the first telecommunications access node to a second telecommunications access node, adjusting a collaborative multi-point (COMP) transmission ratio of packets sent by the first telecommunications access node and the second telecommunications access node by communicating between the first virtual back end unit and a second virtual back end unit of the second telecommunications access node, the first virtual back end unit and the second virtual back end unit instantiated in a pool of processing units.

10. The method as recited in claim 9 further comprising performing floating point operations in the baseband processing units as part of the physical layer processing.

11. The method as recited in claim 10 wherein the physical layer processing includes error detection on a transport channel and indication to high layers, turbo encoding, and turbo decoding.

12. The method as recited in claim 11, providing a plurality of virtual back end units, including the first and second virtual back end units, using the pool of processing units with different dynamic software personalities that are load dependent, instantiated as demand rises, and destroyed as demand is reduced.

13. The method as recited in claim 9, further comprising performing call processing in the first virtual back end unit.

14. A system comprising:
a front end unit to provide physical layer processing and media access control (MAC) sublayer processing for a first type of access node, the front end unit including one or more baseband processing units to perform floating point and fixed point operations and one or more general purpose processors;

a back end unit to provide data link layer and network layer processing for the front end unit of the first type of access node, wherein the back end unit is one of a plurality of virtual back end units instantiated in a pool of processing units, wherein another of the virtual back end units provides processing for a second type of access node; and an internet protocol (IP) packet based communication link coupling the front end unit and the back end unit to provide for data and control packets to be sent between the back end unit and the front end unit;

wherein first and second virtual back end units, respectively instantiated in the pool of processing units for a first access node with a first front end and a second access node with a second front end, during handoff from the first access node to the second access node, adjust a collaborative multi-point (COMP) transmission ratio of packets sent by the first access node and the second access node by communicating between the first and second virtual back end units in the pool of processing units.

15. The system as recited in claim 14 wherein the pool of processing units have different dynamic software personalities that are load dependent, instantiated as demand rises, and destroyed as demand is reduced.

16. The system as recited in claim 14, further comprising:
high speed interconnects for communicating between the plurality of virtual back end units; and an application programming interface for inter-site coordination between multiple ones of the plurality of virtual back end units in the pool of processing units.

* * * * *